United States Patent
Mons et al.

(10) Patent No.: US 8,136,999 B2
(45) Date of Patent: Mar. 20, 2012

(54) TURBOMACHINE SHAFT GUIDANCE

(75) Inventors: Claude Marcel Mons, Savigny le Temple (FR); Laurent Raberin, Paris (FR); Jean-Marc Rongvaux, La Norville (FR); Stephane Rousselin, Hericy (FR)

(73) Assignee: SNECMA, Paris (FR)

( * ) Notice: Subject to any disclaimer, the term of this patent is extended or adjusted under 35 U.S.C. 154(b) by 571 days.

(21) Appl. No.: 12/357,045

(22) Filed: Jan. 21, 2009

(65) Prior Publication Data
US 2009/0185768 A1     Jul. 23, 2009

(30) Foreign Application Priority Data
Jan. 23, 2008 (FR) .................................... 08 00332

(51) Int. Cl.
*F16C 27/00* (2006.01)
*F01D 25/16* (2006.01)

(52) U.S. Cl. ........... 384/581; 415/12; 415/229; 416/174
(58) Field of Classification Search .................... 384/99, 384/535, 581; 415/9, 229, 12; 416/2, 174
See application file for complete search history.

(56) References Cited

U.S. PATENT DOCUMENTS
2008/0181763 A1 * 7/2008 Webster et al. .................... 415/9

FOREIGN PATENT DOCUMENTS
| EP | 1 130 243 A2 | 9/2001 |
| EP | 1 344 896 A1 | 9/2003 |
| EP | 1577422 A1 * | 9/2005 |
| FR | 2 841 592 A1 | 1/2004 |
| FR | 2 888 621 A1 | 1/2007 |
| GB | 2 444 935 A | 6/2008 |

* cited by examiner

*Primary Examiner* — Thomas R Hannon
(74) *Attorney, Agent, or Firm* — Oblon, Spivak, McClelland, Maier & Neustadt, L.L.P.

(57) ABSTRACT

A support for a bearing that guides a shaft in a turbomachine is disclosed. The support includes an annular part made of a shape memory material which retains an initial shape when the load applied to it remains below a threshold value and which deforms, absorbing energy when the applied load becomes at least equal to the threshold value. The annular part is capable of reverting at least approximately to its initial shape when the applied load drops back below the threshold value.

9 Claims, 3 Drawing Sheets

TURBOMACHINE SHAFT GUIDANCE

BACKGROUND OF THE INVENTION

1. Field of the Invention

The present invention relates to supports for bearings that guide rotor shafts in turbomachines such as aircraft bypass turbojet engines.

2. Description of the Related Art

Turbojet engine fan blades may be subjected to damage, for example following ingestion of foreign objects such as birds or blocks of ice.

In general, the fan is robust enough to withstand the effects of such an ingestion and to continue to operate, possibly at a lower speed.

However, ingestion of a foreign body can sometimes cause one or more fan blades to break, this being liable to have the effect of causing significant imbalance requiring the engine to stop, and capable of subjecting the structure of the turbojet engine to considerable cyclic forces, at least while the engine is slowing down to its windmilling or autorotation speed, that is to say to its speed of free rotation as a result of its movement through the atmosphere.

In order to avoid imbalance forces being transferred to the structure of the turbojet engine, it has been proposed for the low pressure compressor shaft that bears the fan to be decoupled from the stator.

This shaft is generally radially guided by two bearings supported by the stator. A first bearing, sometimes known as the upstream bearing or thrust bearing, comprises an antifriction ball bearing positioned at the upstream end of the shaft and is supported by an annular support connected to an intermediate casing of the turbojet engine, while a second bearing, commonly known as the downstream bearing, comprises an antifriction roller bearing positioned downstream of the first bearing.

Devices for decoupling the upstream bearing and comprising "rupture" screws for connecting the support of this bearing to the intermediate casing have been proposed, as have other devices comprising a bearing support that has a local striction engineered to allow the support to deform when the applied load exceeds a predetermined load, and other devices proposed have included a corrugated bearing support intended to buckle under a certain load. Devices comprising "rupture" pins in the region of the upstream bearing have also been proposed.

However, when the upstream bearing has been decoupled from the stator it no longer centres the low-pressure compressor shaft and even though the loads resulting from the imbalance are not of such a great magnitude once the autorotation speed has been reached, these loads are then essentially borne by the downstream bearing, with a risk therefore of breaking the latter.

To avoid this disadvantage, devices have been proposed in which the downstream bearing is, for example, mounted on a support that is articulated to allow the shaft to become off-centred without destroying this downstream bearing, but these devices lead to additional mass penalizing turbojet engine performance.

Furthermore, with the known devices and should the low pressure compressor shaft break, the upstream part thereof is no longer axially retained by the upstream bearing, thus potentially endangering the turbojet engine.

BRIEF SUMMARY OF THE INVENTION

It is a particular object of the invention to provide a simple, economical and effective solution to these problems while at the same time avoiding the aforementioned disadvantages.

A particular object of the invention is to allow the low-pressure compressor shaft to be recentred once one of its guide bearings has been uncoupled, as soon as the turbojet engine has reached its autorotation speed so as to avoid the other guide bearing becoming destroyed and preserve the structure of the turbojet engine.

To this end, the invention proposes a support for a bearing that guides a shaft in a turbomachine, such as a turbojet engine, characterized in that it comprises an annular part made of a shape memory material which retains an initial shape when the load applied to it remains below a threshold value and which deforms, absorbing energy when the applied load becomes at least equal to the threshold value, this annular part being capable of reverting at least approximately to its initial shape when the applied load drops back below the threshold value.

The shape memory annular part, by deforming, decouples the bearing it supports from the casing when the shaft is transmitting to the bearing loads that exceed a predetermined threshold value, so as to absorb the mechanical energy generated by these loads and prevent these loads from being transmitted to the casing and thence to the entire turbojet engine structure.

These loads are typically imbalance loads resulting from the ingestion of a foreign body, such as a bird or a block of ice, which has damaged the turbomachine fan.

Once the engine has stopped, and as soon as the turbojet engine has reached its autorotation speed at which the loads transmitted by the shaft are of lower magnitude, the annular part reverts more or less to its initial shape and thus allows the bearing once more to centre the shaft.

Further, the bearings are capable of ensuring axial retention of the upstream end of the shaft, even during uncoupling.

According to another feature of the invention, the bearing support comprises controlled means of heating the shape memory annular part to cause this annular part to revert to its initial shape when the applied load is below the threshold value.

The heating means are particularly suited to the scenario in which the shape memory material is of the "single-acting" type and is initially in the martensite state capable of deforming substantially under the effect of load, thereby absorbing mechanical energy in order to permit the uncoupling of the bearing support, the heating means thereafter allowing the shape memory material to be made on command to switch to the austenitic phase in order to cause it to revert to a learned shape more or less identical to its initial shape so that the bearing support reverts to its initial shape and is once more able to centre the shaft.

Advantageously, the heating means comprise means of conveying hot air onto the shape memory annular part.

The hot air may, for example, be tapped off the turbojet engine high pressure compressor.

The bearing support according to the invention advantageously comprises means of guiding hot air onto the shape memory annular part, these means for example comprising a sheet metal deflector mounted around the shape memory annular part.

In the case of a material of the "single-acting" type, the sheet metal deflector allows better guidance of the hot air intended to trigger the transition of the shape memory material into the austenitic phase.

As an alternative, the shape memory material is a material of the superelastic type which is in the austenitic phase when the applied load is below the threshold value and which changes into the martensitic phase with elastic deformation when the applied load becomes at least equal to the threshold value.

This means that the substantial ability of superelastic shape memory materials to deform can be put to good use in avoiding the need to resort to means of heating the annular part of the bearing support.

Which of the two alternative forms is chosen may be governed by the respective abilities of the various shape memory materials to absorb mechanical energy.

According to another feature of the invention, the shape memory annular part connects the upstream and downstream ends of the support together, and preferably comprises thin longitudinal blades uniformly distributed about the axis of the turbomachine.

Thin blades such as this are relatively commonplace in the shape memory component marketplace and have a good ability to return to a pre-learned shape.

According to another feature of the invention, the ends of the thin blades are brazed or welded to the end parts of the support.

The bearing support according to the invention advantageously comprises an annular sealing envelope positioned radially on the inside of the shape memory annular part.

This annular sealing envelope is particularly useful in instances where the shape memory annular part comprises thin longitudinal blades of the type mentioned hereinabove, in order to seal the space between the bearings and thus prevent oil from leaking from that space.

The envelope also constitutes a means of guiding hot air onto the shape memory annular part, this being particularly beneficial in instances where the shape memory material is of the "single-acting" type.

The invention also relates to a turbomachine comprising a shaft guided in upstream and downstream bearings which are supported by supports fixed to a casing, characterized in that at least one of the supports is a bearing support of the type described hereinabove.

BRIEF DESCRIPTION OF THE SEVERAL VIEWS OF THE DRAWINGS

The invention will be better understood, and further details, advantages and features thereof will become more clearly apparent, from reading the following description given by way of nonlimiting example with reference to the attached drawings in which.

DETAILED DESCRIPTION OF THE INVENTION

Figure 1:
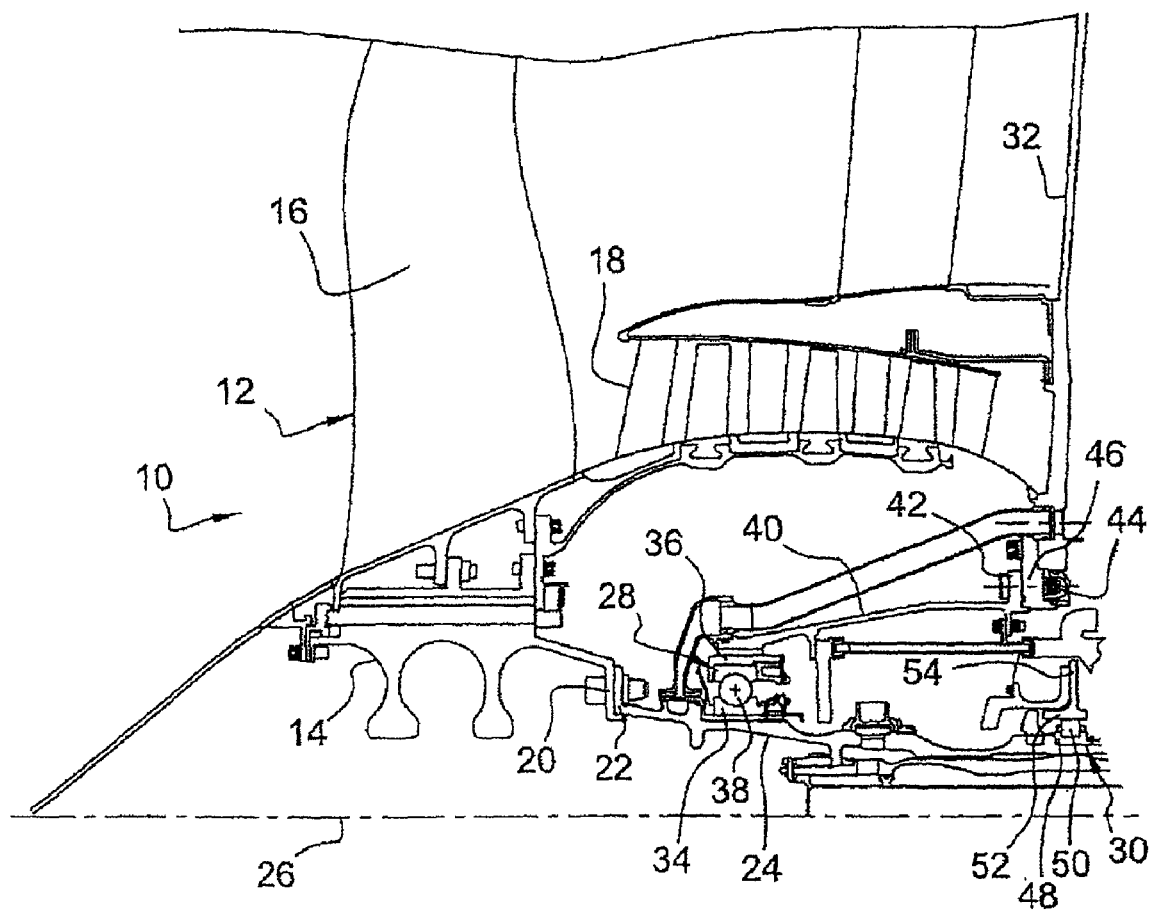
FIG. 1 is a partial schematic view in axial section of a turbomachine of a known type.

FIG. 1 shows an aircraft bypass turbojet engine 10 comprising a fan 12 formed of a disk 14 bearing blades 16 and mounted upstream of a low-pressure compressor 18, the disk 14 being connected by an annular flange 20 to an upstream end flange 22 of a shaft 24 of the low-pressure compressor intended to drive the rotation of the fan 12 about the axis 26 of the turbojet engine, in a way that is well known.

The shaft 24 is guided radially and retained axially by two bearings 28 and 30 supported by an intermediate casing 32.

A first bearing 28 positioned near the upstream end of the shaft 24, commonly termed "thrust bearing" or "upstream bearing", comprises an antifriction ball bearing formed essentially of a radially internal annular cage 34 and of a radially external annular cage 36 delimiting a substantially toric cavity in which balls 38 run freely.

The radially external annular cage 36 is connected to the upstream end of a substantially annular or slightly frustoconical envelope that forms a bearing support 40, the downstream end of which has an annular flange 42 fixed by screws 44 to a component 46 connected to the intermediate casing 32.

A second bearing 30 is positioned downstream of the first bearing 28 and comprises an antifriction roller bearing formed essentially of a radially internal annular ring 48 bearing rollers 50 on which a radially external annular ring 52 rests.

The radially external annular ring 52 has a flange 54 for attachment to the intermediate casing 32.

In operation, the bearings 28 and 30 radially centre and axially retain the low-pressure compressor shaft 24, the bearing 28 in particular providing axial retention of the upstream end of the shaft should this shaft break.

In the event of an incident that damages the fan and introduces an imbalance, such as the loss of a fan blade following ingestion of a foreign body into the turbojet engine for example, the bearings 28 and 30 are subjected to considerable cyclic forces and transmit a significant proportion of these forces to the intermediate casing 32.

Although the engine is generally stopped as soon as such an incident occurs, it nonetheless takes the turbojet engine a certain length of time to reach its autorotation speed, that is to say the speed at which it rotates freely as a result of its movement through the atmosphere.

During this space of time, the upstream bearing 28, which is closest to the fan 12 and thus experiences the majority of the imbalance forces, runs the risk of being damaged and of damaging the intermediate casing 32 to which it is connected, and thereby the entire structure of the turbojet engine.

It is therefore beneficial, in order to protect the upstream bearing 28 and to spare the structure of the turbojet engine from the imbalance forces, to allow uncoupling between this upstream bearing 28 and the intermediate casing 32, that is to say to minimize the forces transmitted to the intermediate casing by the shaft 24 of the low pressure rotor.

When the turbojet engine reaches the autorotation speed, it is, however, desirable for means of centring the shaft to be available once again, so as to prevent the downstream bearing 30 from withstanding all the imbalance loads alone as these loads, although of lesser magnitude under these conditions of free rotation, are nonetheless liable, in the long term, to damage this downstream bearing 30.

In order to meet this need, the invention proposes to replace the upstream bearing support 40 of the turbomachine 10 with a bearing support capable of deforming in order to allow the upstream bearing 28 to become uncoupled when the loads applied to the upstream bearing are too great, and capable of reverting to a shape close to its initial shape when the applied loads have reduced sufficiently, so that the upstream bearing 28 can once again serve to centre and to axially retain the shaft 24.

Figure 2:
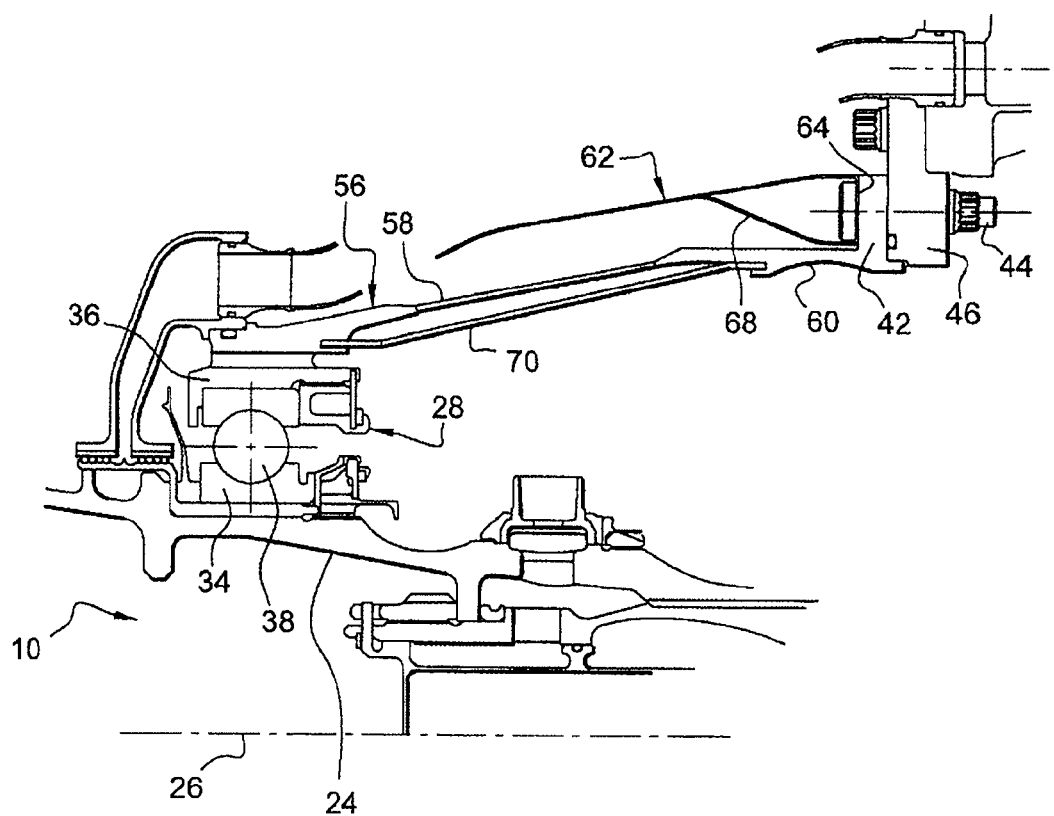
FIG. 2 is a partial schematic view in axial section on a larger scale of a turbomachine according to the invention.
Figure 3:
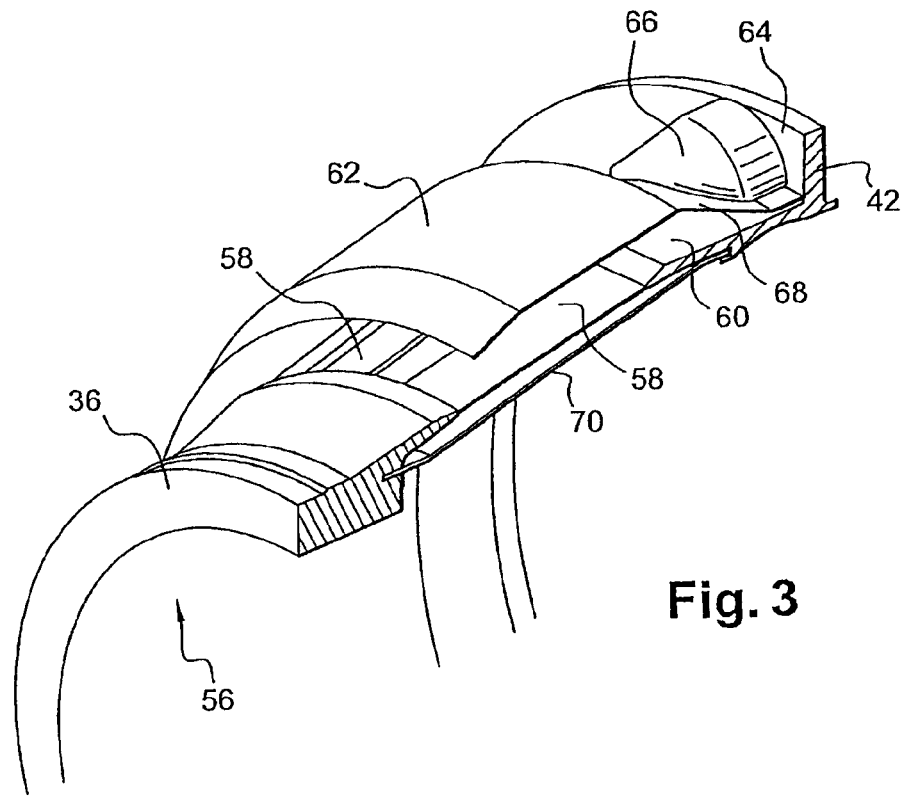
FIG. 3 is a perspective partial schematic view of the turbomachine of FIG. 2.

As shown by FIGS. 2 and 3, this new upstream bearing support denoted by the reference 56 comprises an annular or slightly frustoconical part formed of thin blades 58, for example ten of these, uniformly distributed about the axis of the turbojet engine and connecting the upstream end 36 of the bearing support 56, which bears the radially external cage of the upstream bearing 28, to its downstream end 60 that bears the flange 42 for attachment to the component 46 connected to the intermediate casing 32, these thin blades being, for example, welded or brazed to the ends 36 and 60 of the bearing support 56.

In a first embodiment, the thin blades 58 are made of a shape memory material of the "single-acting" type, such as an alloy of nickel and of titanium, commonly known as Nitinol.

The shape memory material, which is initially in the martensitic phase, gives the thin blades 58 a good ability to deform and the possibility, when heated, of changing into the austenitic phase, reverting to a learned shape.

In order for the bearing support 56 to revert to its initial shape after having been deformed, the thin blades are prepared beforehand so that, in the austenitic phase, they adopt a shape similar to their initial shape prior to deformation, as will be explained in greater detail in a later paragraph dealing with the operation of the invention and more specifically with the use of "one-way" memory effect of the shape memory material, with reference to FIG. 4.

To heat the thin blades 58, the turbojet engine 10 comprises means for directing onto the thin blades air at a temperature higher than the austenitic phase transition temperature of the shape memory material of which the thin blades are made, it being possible for this hot air to have been, for example, tapped from a high-pressure compressor located downstream of the low-pressure compressor 18.

These means essentially comprise a deflector 62 formed of a substantially cylindrical sheet metal envelope surrounding the thin blades 58 and which at its downstream end has an annular flange 64 for attachment to the flange 42 of the bearing support 56.

Ducts 66 for guiding the hot air are formed in a downstream frustoconical part 68 of the deflector 62 and are positioned facing openings formed in the flange 42 to allow the hot air to flow in the upstream direction.

In order to seal the space between the bearings, that is to say the volume between the upstream 28 and downstream 30 bearings and the bearing support 56, given the bladed structure of the latter, a cylindrical envelope made of a flexible material such as an elastomer joins the upstream 36 and downstream 60 ends of the bearing support 56 together in such a way as to form an apron 70.

This apron 70 is positioned radially on the inside of the bearing support and, as appropriate, keeps the hot air near the thin blades 58.

Figure 4:
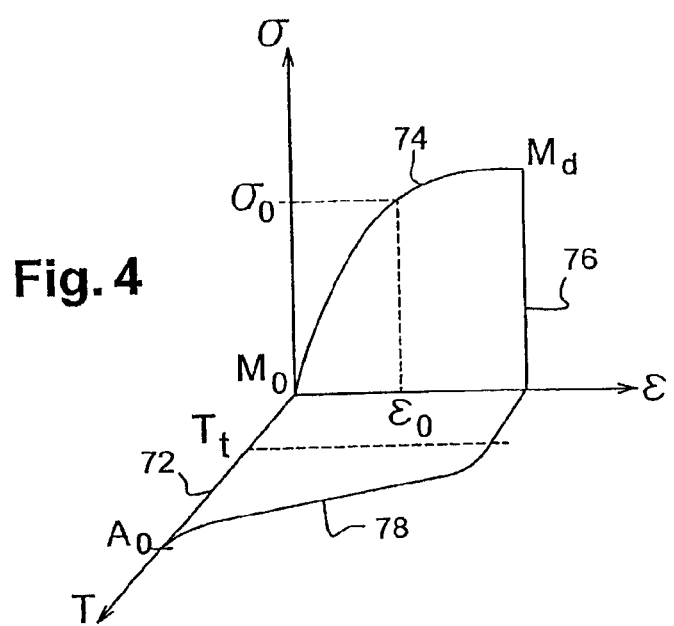
FIG. 4 is a thermomechanical diagram illustrating how the invention works.

FIG. 4 is a diagram representing the deformation $\epsilon$ of the thin blades of shape memory material as a function of the mechanical stress $\sigma$ applied to them and of temperature T, during the operation of the turbojet engine described previously.

During the course of the preparation of the thin blades 58, they will have been given a shape corresponding to the normal geometry of the bearing support 56, when the thin blades were in the austenitic phase at a high temperature, this state being represented by point $A_0$ in FIG. 4, then the thin blades will have been cooled without applying any stress to them in order to cause them to change without deformation into the martensitic phase, in a transition 72 culminating in the state $M_0$ of FIG. 4.

During normal operation, the thin blades 58 are more or less in this state $M_0$, so that the upstream bearing 28 performs its functions of centring and of axially retaining the low pressure compressor shaft 24. As long as the mechanical stress $\sigma$ applied to the thin blades is below a threshold value $\sigma_0$, their rigidity remains relatively high, their deformation $\epsilon$ not exceeding a relatively low value $\epsilon_0$, thus allowing them precisely to guide the upstream part of the shaft 24.

When the fan suffers damage, for example following the ingestion of a foreign body and, in particular, in the event of the loss of a blade, considerable imbalance forces are transmitted to the bearings that guide the shaft 24, and more especially to the upstream bearing 28 which is closest to the fan.

The mechanical stress applied to the thin blades 58 then exceeds the threshold value $\sigma_0$ which means that the rigidity of the thin blades drops sharply, as indicated by the curve 74 in FIG. 4, and at the same time their ability to absorb mechanical energy increases.

The forces transmitted to the upstream bearing 28 are then dissipated by the deformation of the thin blades 58, and are therefore not transmitted to the intermediate casing 32 to which this bearing 28 is connected.

Under the effect of the loads applied to them, the thin blades thus reach an uncoupled state represented by the Point $M_d$.

At the same time, the engine is stopped by an automatic control system or on the command of the aircraft pilot, and its speed therefore gradually decreases down to the autorotation speed caused by the movement of the aircraft through the atmosphere, which means that the imbalance load is also decreased.

This change in stress is represented by the curve 76 in FIG. 4, which corresponds to the special case in which the applied load returns to substantially zero.

As soon as the loads have decreased appreciably and no longer present any danger to the structure of the aircraft, the automatic control system or the pilot commands that hot air tapped from the turbojet engine high pressure compressor be sent to the thin blades.

Subjected to a temperature higher than their transition temperature $T_t$, the thin blades change into the austenitic phase along the curve 78 and revert to their initial shape through a memory effect, thus recentring the low pressure compressor shaft 24.

The bearing support 56 proposed by the invention therefore allows uncoupling between the upstream bearing 28 and the intermediate casing 32 when the loads transmitted by the low pressure compressor shaft 24 are too great, while at the same time offering the possibility of recentring this shaft as soon as the loads have dropped back to an acceptable level.

The shape memory material of the thin blades is chosen such that they remain in the elastic domain of the martensitic phase, in which the rigidity of the thin blades remains substantially constant irrespective of the applied stress, under normal operating conditions, and so that they depart from this elastic domain as soon as the applied loads exceed a threshold value $\sigma_0$ liable to endanger the turbojet engine. The material is also chosen such that its rigidity, in the aforementioned elastic domain, allows it to meet the overall flexibility requirement for the bearing support 56.

The device comprising the bearing support 56, the deflector 62 and the apron 70 also has the advantage of not significantly increasing the mass of the turbojet engine and of comprising a limited number of parts.

In a second embodiment, instead of using a one-way shape memory effect, the bearing support 56 according to the invention may work by virtue of a superelastic effect of the shape memory material of which the thin blades 58 are made.

In this embodiment, the shape memory material is chosen such that it is in the austenitic phase at turbojet engine normal operating temperatures.

The imbalance forces applied to the bearing support 56 cause the shape memory material to pass under stress into the martensitic phase in which this material has an enormous capacity for elastic deformation.

As soon as the applied loads disappear or reduce sufficiently, the material returns to the elastic domain of the austenite, reverting to its initial shape.

This embodiment of the invention has the advantage of not requiring any means of heating the shape memory material, and therefore proves to be simpler to implement than the previously described first embodiment.

However, which variant is chosen will essentially depend on the cost and availability of the various types of shape memory materials.

The invention claimed is:

1. A support for a bearing that guides a shaft in a turbomachine, the support comprising:
   an annular part made of a shape memory material which retains an initial shape when the load applied to it remains below a threshold value and which deforms, absorbing energy when the applied load becomes at least equal to the threshold value, this annular part being capable of reverting at least approximately to its initial shape when the applied load drops back below the threshold value; and
   controlled means of heating the shape memory annular part to cause this annular part to revert to its initial shape when the applied load is below the threshold value.

2. A bearing support according to claim 1, wherein the heating means comprise means of conveying hot air onto the shape memory annular part.

3. A bearing support according to claim 2, further comprising means of guiding hot air onto the shape memory annular part.

4. A bearing support according to claim 3, wherein the guide means comprise a sheet metal deflector mounted around the shape memory annular part.

5. A bearing support according to claim 1, wherein the shape memory annular part connects upstream and downstream ends of the support together.

6. A bearing support according to claim 1, wherein the shape memory annular part comprises thin longitudinal blades uniformly distributed about the axis of the turbomachine.

7. A bearing support according to claim 6, wherein the ends of the thin blades are brazed or welded to the end parts of the support.

8. A bearing support according to claim 1, further comprising an annular sealing envelope positioned radially on the inside of the shape memory annular part.

9. A turbomachine comprising a shaft guided in upstream and downstream bearings which are supported by supports that are fixed to a casing, wherein at least one of the supports is a bearing support according to claim 1.

* * * * *